(12) United States Patent
Tao et al.

(10) Patent No.: US 10,255,235 B2
(45) Date of Patent: Apr. 9, 2019

(54) DATABASE STORAGE SYSTEM BASED ON JUKEBOX AND METHOD USING THE SYSTEM

(71) Applicants: Guangyi Tao, Beijing (CN); Yachun Lian, Beijing (CN); Zichuan Lian, Beijing (CN)

(72) Inventors: Guangyi Tao, Beijing (CN); Yachun Lian, Beijing (CN); Zichuan Lian, Beijing (CN)

( * ) Notice: Subject to any disclaimer, the term of this patent is extended or adjusted under 35 U.S.C. 154(b) by 733 days.

(21) Appl. No.: 14/784,184

(22) PCT Filed: Sep. 29, 2013

(86) PCT No.: PCT/CN2013/084641
§ 371 (c)(1),
(2) Date: Oct. 13, 2015

(87) PCT Pub. No.: WO2014/169587
PCT Pub. Date: Oct. 23, 2014

(65) Prior Publication Data
US 2016/0055189 A1    Feb. 25, 2016

(30) Foreign Application Priority Data

Apr. 18, 2013   (CN) .......................... 2013 1 0136328

(51) Int. Cl.
*G06F 16/30*        (2019.01)
*G06F 16/22*        (2019.01)
(Continued)

(52) U.S. Cl.
CPC .......... *G06F 16/2228* (2019.01); *G06F 16/21* (2019.01); *G11B 27/002* (2013.01); *G11B 2220/2537* (2013.01); *G11B 2220/41* (2013.01)

(58) Field of Classification Search
CPC ......... G06F 17/30321; G06F 17/30289; G11B 27/002; G11B 2220/2537; G11B 2220/41
See application file for complete search history.

(56) References Cited

U.S. PATENT DOCUMENTS

2003/0063544 A1* 4/2003 Matsumoto .......... G11B 7/0045
                                                    369/59.14
2005/0033755 A1* 2/2005 Gokhale ............... G06F 3/0608
(Continued)

*Primary Examiner* — Alexander Khong
(74) *Attorney, Agent, or Firm* — Novoclaims Patent Services LLC; Mei Lin Wong

(57) ABSTRACT

A database storage system based on Jukebox comprises a server, a jukebox and a magnetic disk storage. The database management system comprises a field structure generation module, a record index generation module, a storage space allocation module, a storage space status module, a record linkage module, a record split module; further comprises a database creation and input on optical disk module, a search-term storage module, a search-term index generation module. By means of the present invention, a database is directly created on a write-once optical disk or an optical disk of other types, data is input into the database on the optical disk; full-text search for the databases on the optical disks in the jukebox can be performed within seconds, an original file of a database file on an optical disk can be retrieved within seconds, solving effectively the technical problems of managing and accessing large-scale optical disks with databases.

10 Claims, 4 Drawing Sheets

(51) Int. Cl.
  *G06F 16/21* (2019.01)
  *G11B 27/00* (2006.01)

(56) References Cited

U.S. PATENT DOCUMENTS

2007/0019511 A1* 1/2007 Isozaki .................. G11B 17/26
                                                              369/30.28
2007/0122105 A1* 5/2007 Fukuda ................ G11B 27/034
                                                              386/265

* cited by examiner ered by the method of Windows
DATABASE STORAGE SYSTEM BASED ON JUKEBOX AND METHOD USING THE SYSTEM

CROSS REFERENCE OF RELATED APPLICATION

This is a national phase national application of an international patent application number PCT/CN2013/084641 with a filing date of Sep. 29, 2013, which claimed priority of a foreign application number CN 201310136328.1 with a filing date of Apr. 18, 2013 in China. The contents of these specifications, including any intervening amendments thereto, are incorporated herein by reference.

BACKGROUND OF THE PRESENT INVENTION

Field of Invention

The present invention relates to a database storage system and method, and particularly relates to a database storage system and method using a jukebox, and a database is created directly on a write-once optical disk or an optical disk of other types and data is input into the database on the write-once optical disk or the optical disk of other types using the jukebox.

Description of Related Arts

In the existing technology, a database and a database management system (DBMS) are usually established on a magnetic disk storage which consists of different topological forms in order to obtain a high speed response performance. But, because the use of the databases is different, it leads to other performance index of the databases is not outstanding, even worse. Because the content on the magnetic disk can be changed in real-time, the hard disk array cannot be used in the occasion required for higher security, which data and database cannot be rewritten and are not affected by magnetic impact, low power consumption and low carbon emissions. The data on the magnetic disk are easy lost due to the physical damage of the magnetic disk, therefore a backup system must be configured to backup data in real-time or regularly. A real-time backup system will also increase equipment investment and power consumption, while a regular backup system adopts often an incremental backup, and backups data in storage devices, such as the magnetic tape etc., the backed-up data cannot be read and used directly by the DBMS, the restoration time of backed-up data is long, and the normal operation time of the database system is affected during the restoration.

Therefore, the data that must be preserved for long-term, as well as the data that belongs to being archived and preserved are not suitable for being stored using the magnetic disk storage device. With the rapid increase of file and data in various formats, the problems of their storage and use are challenging for the structure design of software and hardware of the database system. In the patent application named "Database Storage System based on Optical Disk and Method Using the System" with the patent application number CN 201210431169.3, a technical solution is provided, in which the database in the magnetic disk storage is split onto the optical disks by the original database format using a database management system, including the field structure generation module (u1), the record index generation module (u2), the storage space allocation module (u3), the storage space status module (u4), the record linkage module (u5), the record split module (u6), the database creation on optical disk module (u7), the database structure generation module (u8), the record merge module (u9) of the database management system. The way of solution is provide for the various applications to access and use the database and data on the optical disk. On this basis, it is possible to form a complete database stored in large-scale on optical disks. This invention does not relate to a technical solution of creating directly a database on an optical disk (including the write-once optical disk) and inputting data into the database on the optical disk (including the write-once optical disk).

In the existing technology, a jukebox and a jukebox management system can become a basis of software and hardware for databases stored in large-scale on optical disks. The jukebox management system operates the jukebox hardware, including management of an exchanging optical disk mechanism and optical disk drives, management of files, reading and writing by the optical disk drives and transferring data, etc. The model of a jukebox and the situation of each slot in the jukebox can be seen by the jukebox management system, such as: the position of an optical disk, whether there is an optical disk on a slot, the type of an optical disk: CD, DVD or BD, a write-once optical disk or a rewritable optical disk, an optical disk without content or an optical disk with content, a volume label (disk name), and an activated optical disk or an unactivated optical disk, etc. The jukebox is seen as a whole by the jukebox management system, which does not relate to the number of optical disks in the jukebox. The jukebox management system connects seamlessly with the data structure with system grade, including the file structure and the directory structure of the operation system etc., which makes the jukebox map as a drive letter. The jukebox is equivalent to a partition on the hard disk, such as: E disk or Z disk. The volume label (disk name) of each optical disk is equivalent to a folder on the hard disk. The volume label (disk name) of the optical disks in the jukebox, the folder name and the file name under the volume label can be seen in the resource manager of Windows system. The optical disks are searched and retrieved by the method of Windows system. When a user accesses a file, he/she does not need to know the physical location of the optical disk in the jukebox. The path of a database on an optical disk in a jukebox is: the letter drive of the jukebox\the volume label of the optical disk\the database.

SUMMARY OF THE PRESENT INVENTION

An object of the present invention is to provide a database storage system based on jukebox in order to solve the technical problems of being unable to centrally manage and access the databases stored in large-scale on optical disks.

Another object of the present invention is to provide a method using the above mentioned database storage system based on jukebox in order to solve the technical problems of directly creating a database on an optical disk, directly inputting data into the database on the optical disk, managing and accessing the large-scale optical disks with databases.

According to the present invention, the database storage system based on jukebox comprises a server, a jukebox and a magnetic disk storage; a data connection is established between the server and the jukebox, and a data connection is established between the server and the magnetic disk storage; a database management system and a jukebox management system are installed in the operation system on the server; the database management system is arranged for completing the database management and data management of the magnetic disk and the optical disk storage devices in response to data requests; the jukebox management system is arranged for completing connection of data structure between the jukebox and the operation system; wherein the database management system comprises a field structure generation module, a record index generation module, a storage space allocation module, a storage space status module, a record linkage module, a record split module.

Wherein the database management system further comprises a database creation and input on optical disk module, a search-term storage module, and a search-term index generation module.

The database creation and input on optical disk module creates directly a database file on an optical disk, inputs directly data into the database on the optical disk, by the database management system generates the field structure information and the index information of the corresponding records, records the position information and the space information of the standard storage units, and forms the database properties data of the database on the optical disk.

The search-term storage module stores the word stock of the search term including the semantic information, and the search term includes at least word, phrase and digital.

The search-term index generation module creates the search term index data of the records corresponding to the marked information according to the index information of each record of the database, including the frequency of appearance of the search term and the position of the search term in each record, and writes the index data into the database file or the database management system.

The database management system further comprises a database structure generation module, which forms a definition file of the database structure for the structure information of the database; the database management system creates the database having the same database structure on the optical disk in the jukebox based on the definition file of the database structure.

The method for transferring a database created on a magnetic disk onto an optical disk in a jukebox using the above mentioned database storage system based on jukebox includes the following steps: in step 11, obtaining the capacity parameters of the optical disk storage media in the jukebox by the database management system through the jukebox management system; in step 12, according to the capacity of the optical disk storage media, completing the split of the database on the magnetic disk by the database management system through the record split module, and forming the marked information of subdatabases; in step 13, creating a database file on the corresponding optical disk in the jukebox by the database management system through the database creation and input on optical disk module; in step 14, writing the field structure information of the corresponding records into the database file on each optical disk in the jukebox by the database management system through the field structure generation module; in step 15, writing the index information of the corresponding records into the database file on each optical disk in the jukebox by the database management system through the record index generation module; in step 16, writing the position information of the standard storage units of the corresponding records into the database file on each optical disk in the jukebox by the database management system through the storage space allocation module; in step 17, recording the space information of the standard storage units by the database management system through the storage space status module; in step 18, generating the corresponding database properties data in the database on each optical disk in the jukebox, and completing the database creation and storage by the database management system through the record linkage module; and in step 19, generating the search term index data corresponding to the database on each optical disk by the database management system through the search-term index generation module.

The method for directly creating a database on an optical disk in a jukebox using the above mentioned database storage system based on jukebox includes the following steps: in step 21, obtaining the capacity parameters of the optical disk storage media in the jukebox by the database management system through the jukebox management system; in step 22, creating a database file on the optical disk storage media by the database management system through the database structure generation module; in step 23, increasing the records into the database file on the optical disk storage media by the database management system through the database creation and input on optical disk module, retaining the written field structure information of the corresponding records through the field structure generation module, retaining the index information of the corresponding records through the record index generation module, retaining the position information of the standard storage units of the corresponding records through the storage space allocation module, retaining the recorded space information of the standard storage units through the storage space status module, and retaining the corresponding database properties data generated through the record linkage module by the database management system; in step 24, repeating step 23, updating the retained database properties data; in step 25, when the capacity of the database reaches the capacity value of the storage space of the optical disk, writing the retained database properties data into the database on the optical disk by the database management system, and completing the database creation and the storage of the records on the optical disk; in step 26, generating the search term index data corresponding to the database on the optical disk by the database management system through the search-term index generation module; and in step 27, repeating step 21 to 26 until finishing the data storage.

The search term index data corresponding to the database on each optical disk is stored in the optical disk storage media of the corresponding database by the database management system.

The search term index data corresponding to the database on each optical disk is stored in the magnetic disk storage by the database management system.

The database storage system based on jukebox of this invention creates directly a database on a write-once optical disk or an optical disk of other types and inputs directly data into the database on the optical disk, and separates the database file and the corresponding full-text index data file to make the full-text index data file able to be stored independently in the magnetic disk storage, performs full-text search for the databases on the optical disks in the jukebox within seconds, retrieves an original file of a database file on an optical disk within seconds, which brings the response performance of the database on the optical disk close to that of on-line storage on the magnetic disk. The database storage system based on jukebox has reached practical applications, can replace gradually magnetic disk array, magnetic disk and tape library in some fields. According to the realization of the massive storage operation of the database and application methods, it is considered that the storage of the optical disk is equivalent to the storage of the magnetic disk in this invention.

Moreover, the backup process of a database is simplified. A massive database can be split into several subdatabases, and the subdatabases are separately stored on optical disks. A large number of the optical disks are integrated into the file management of the operation system using the jukebox, data backup and data management can be performed directly on the optical disks. The data that is stored in the tape library and must be preserved for long-term can be transferred and stored into the jukebox. The data that is stored in the magnetic disk array and magnetic disk and is used often, but infrequently, can be transferred and stored into the jukebox.

The present invention is further illustrated through the following embodiments and the accompanying drawings.

DETAILED DESCRIPTION OF THE PREFERRED EMBODIMENT

Figure 1:
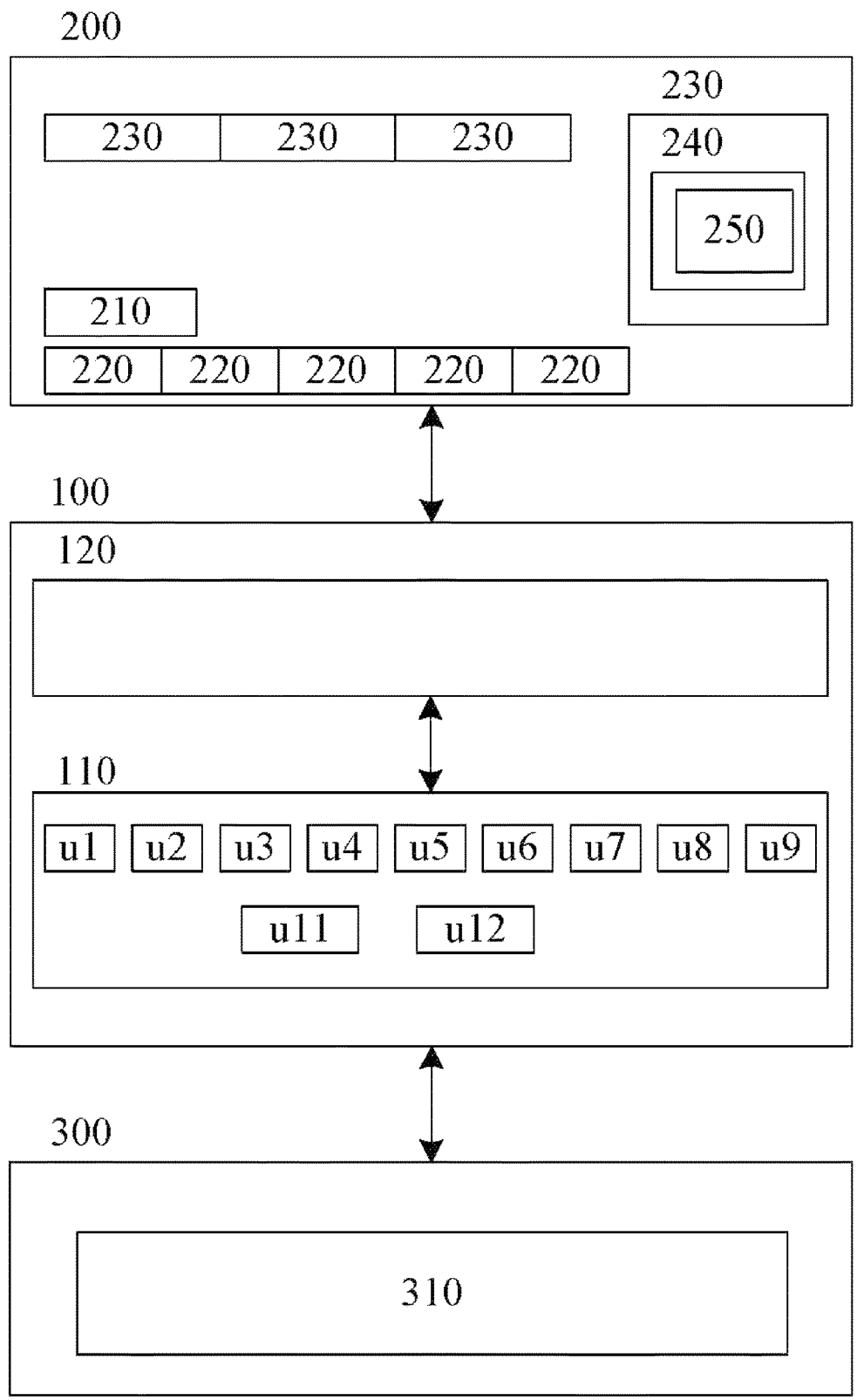
FIG. 1 is a schematic diagram of the structure of the database storage system based on jukebox of the present invention.

According to the preferred embodiment of the present invention, which is shown in FIG. 1, a database storage system based on jukebox comprises a server (100), a jukebox (200) and a magnetic disk storage (300); a data connection is achieved via a transmission chain between the server (100) and the jukebox (200), and a data connection is achieved via a transmission chain between the server (100) and the magnetic disk storage (300); a database management system (110) and a jukebox management system (120) are installed in the operation system on the server (100).

The jukebox (200) comprises an exchanging optical disk mechanism (210) (such as robot), optical disk drives (220) and magazines (230). According to the specification of optical disks (240) in the magazines, the optical disk drives of corresponding types are configured.

Figure 2:
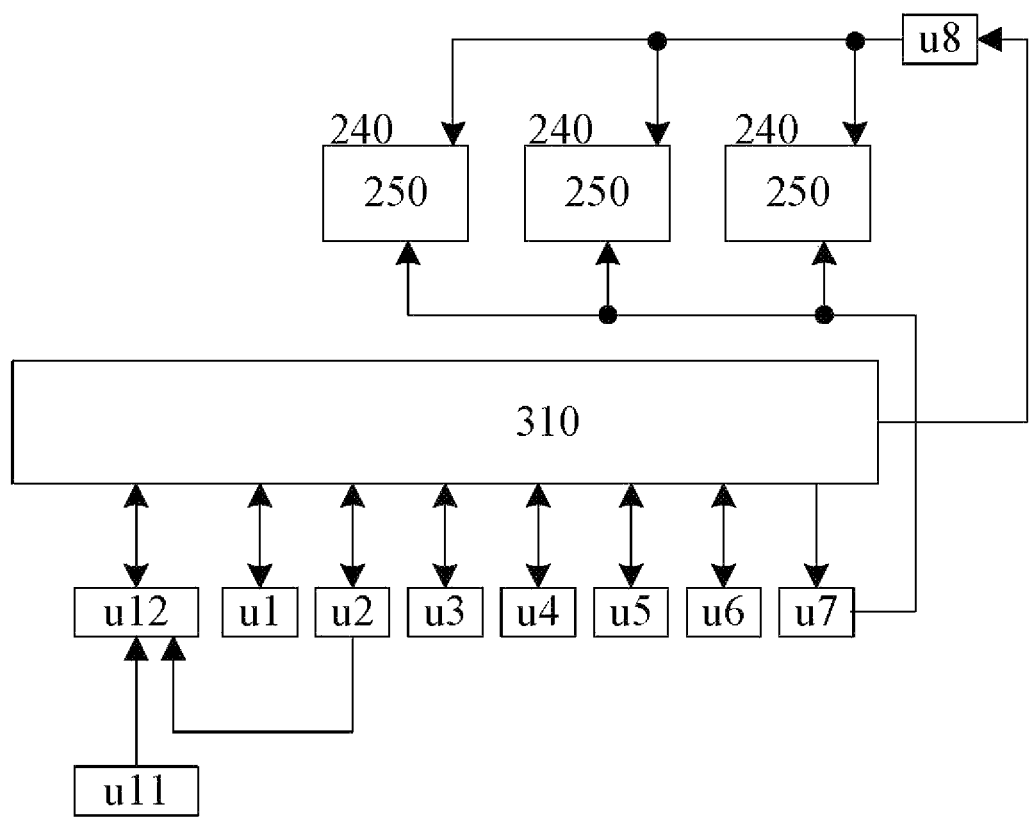
FIG. 2 is a schematic diagram of the structure of the database management system according to the preferred embodiment of the database storage system based on jukebox of the present invention.

As shown in FIG. 2, the database management system (110) comprises a field structure generation module (u1), a record index generation module (u2), a storage space allocation module (u3), a storage space status module (u4), a record linkage module (u5), a record split module (u6).

The database management system (110) further comprises a database creation and input on optical disk module (u7) which creates directly a database file on an optical disk and inputs directly data into the database on the optical disk, by the database management system (110) generates the field structure information and the index information of the corresponding records, records the position information and the space information of the standard storage units, and forms the database properties data of the database on the optical disk.

The database management system (110) further comprises a search-term storage module (u11) which stores the word stock of the search term including the semantic information, and the search term includes, but is not limit to, word, phrase, digital, as well as format and type of data etc.

The database management system (110) further comprises a search-term index generation module (u12) which creates the search term index data of the records corresponding to the marked information according to the index information of each record of the database, including the frequency of appearance of the search term and the position of the search term in each record, and writes the index data into the database file or the database management system (110).

The database management system (110) further comprises a database structure generation module (u8) which forms a definition file of the database structure for the structure information of the database; the database management system (100) creates the database (250) having the same database structure on the optical disk (240) in the jukebox (200) based on the definition file of the database structure.

The database (250) on the optical disk is the database created on the optical disk. Specifically, the database is a standard database file.

According to the preferred embodiment of the present invention, the database (310), which is created on the magnetic disk in the magnetic disk storage (300) by the database management system, can be used to complete high efficient treatment of forming the storage of the records of the database for the information data. By means of the field structure generation module (u1), the record index generation module (u2), the storage space allocation module (u3), the storage space status module (u4), the record linkage module (u5), the record split module (u6), the database creation and input on optical disk module (u7), the split of the database (310) on the magnetic disk in the magnetic disk storage (300) can be completed and several complete subdatabases having same database structure are generated. The capacity of the subdatabases corresponds to the capacity of the corresponding optical disks. By means of the database creation and input on optical disk module (u7), the corresponding database (250) is created on the optical disk (240) in the jukebox (200) by the jukebox management system (120), or by means of database structure generation module (u8), the corresponding database structure is created on the optical disk (240) in the jukebox (200) by the jukebox management system (120) to generate the database (250) into which records are input incrementally.

Moreover, during the database is generated in the magnetic disk storage (300), by means of the word stock of the search term in the search-term storage module (u11), the position index as the important information of the search term in the database is generated by the search-term index generation module (u12). In this way, for searching the information of the databases in the jukebox (200), it is no longer necessary to traverse the contents of the records of the databases on all optical disks, the position of the information can be determined, which compensates the defect of a very long response time of searching the data information of the database based on the jukebox compared with the response time of searching the data information of the database in the magnetic disk storage (300).

In a framework of the above mentioned preferred embodiment, TRIP system and EfarmB software are adopted as the database management system (110), the used jukebox (200) is Grundig jukebox: GMS2105 or GMS3560. 105 pieces of optical disks can be stored and 5 optical drives can be installed in GMS2105. 560 pieces of optical disks can be stored and 6 optical drives can be installed in GMS3560. PoINT software is adopted as the jukebox management system (120).

Figure 3:
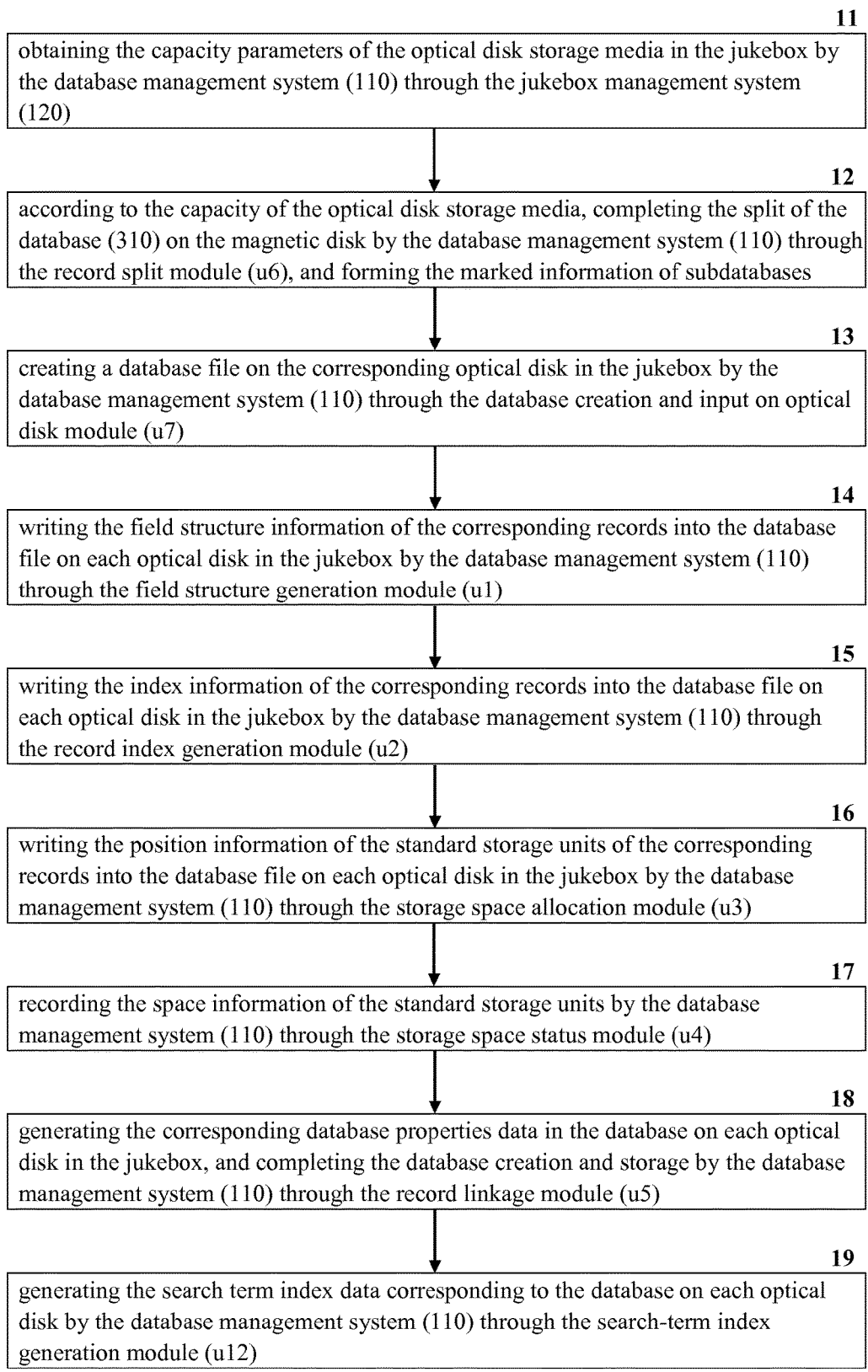
FIG. 3 is flow diagram 1 of methods for data processing using the database storage system based on jukebox according to the preferred embodiment of the present invention.

As shown in FIG. 3, the method for creating a database on an optical disk in two-stage method using the database storage system based on jukebox includes the following steps: in step 11, obtaining the capacity parameters of the optical disk storage media in the jukebox by the database management system (110) through the jukebox management system (120); in step 12, according to the capacity of the optical disk storage media, completing the split of records of the database (310) (the split of the database) on the magnetic disk by the database management system (110) through the record split module (u6), and forming the marked information of subdatabases; in step 13, creating a database file on the corresponding optical disk in the jukebox by the database management system (110) through the database creation and input on optical disk module (u7); in step 14, writing the field structure information of the corresponding records into the database file on each optical disk in the jukebox by the database management system (110) through the field structure generation module (u1); in step 15, writing the index information of the corresponding records into the database file on each optical disk in the jukebox by the database management system (110) through the record index generation module (u2); in step 16, writing the position information of the standard storage units of the corresponding records into the database file on each optical disk in the jukebox by the database management system (110) through the storage space allocation module (u3); in step 17, recording the space information of the standard storage units by the database management system (110) through the storage space status module (u4); in step 18, generating the corresponding database properties data in the database on each optical disk in the jukebox, and completing the database creation and storage by the database management system (110) through the record linkage module (u5); and in step 19, generating the search term index data corresponding to the database on each optical disk by the database management system (110) through the search-term index generation module (u12).

By means of the method of the present invention, the unified management of the data of the databases on the optical disks, which is generated from existing massive data, can be completed by the jukebox; the databases on the optical disks become a component part of the file structure in the operation system; in this way, the split of the database and the change of the data on the optical disk can be realized.

The full-text index data corresponding to the database on each optical disk can be stored either on the optical disk of the corresponding database, or in the magnetic disk storage by the database management system (110) to improve the performance of the data search.

Figure 4:
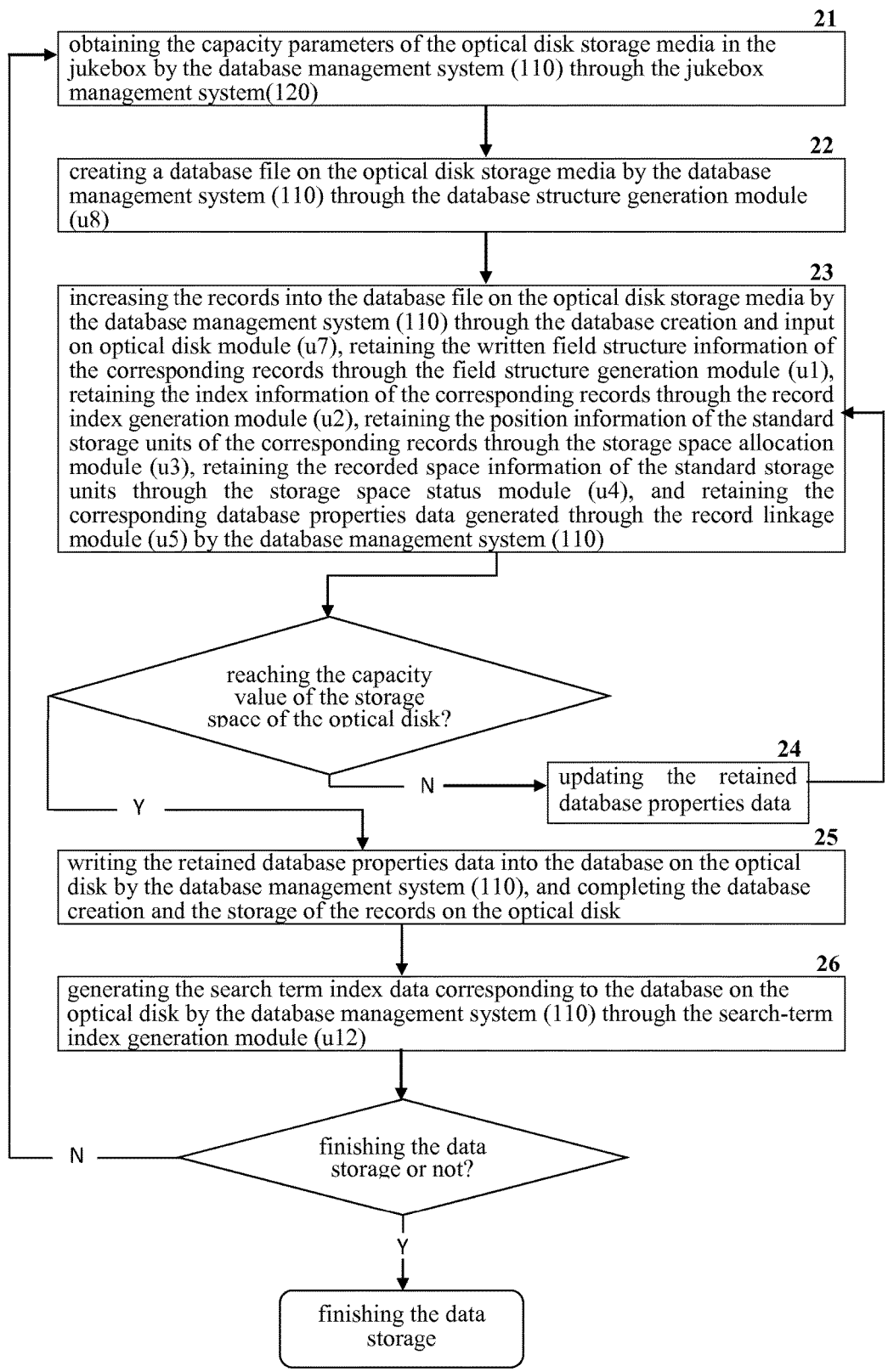
FIG. 4 is flow diagram 2 of methods for data processing using the database storage system based on jukebox according to the preferred embodiment of the present invention.

As shown in FIG. 4, the method for directly creating a database on an optical disk using the database storage system based on jukebox includes the following steps: in step 21, obtaining the capacity parameters of the optical disk storage media in the jukebox by the database management system (110) through the jukebox management system (120); in step 22, creating a database file on the optical disk storage media by the database management system (110) through the database structure generation module (u8); in step 23, increasing the records into the database file on the optical disk storage media by the database management system (110) through the database creation and input on optical disk module (u7), retaining the written field structure information of the corresponding records through the field structure generation module (u1), retaining the index information of the corresponding records through the record index generation module (u2), retaining the position information of the standard storage units of the corresponding records through the storage space allocation module (u3), retaining the recorded space information of the standard storage units through the storage space status module (u4), and retaining the corresponding database properties data generated through the record linkage module (u5) by the database management system (110); in step 24, repeating step 23, updating the retained database properties data; in step 25, when the capacity of the database reaches the capacity value of the storage space of the optical disk (the capacity of the optical disk or less than the set value of the capacity of the optical disk), writing the retained database properties data into the database on the optical disk by the database management system (110), and completing the database creation and the storage of the records on the optical disk; in step 26, generating the search term index data corresponding to the database on the optical disk by the database management system (110) through the search-term index generation module (u12); and in step 27, repeating step 21 to 26 until finishing the data storage.

By means of the method of the present invention, directly creating a database on an optical disk and directly increasing data into the database on the optical disk can be completed by the jukebox, so that the database storage system based on jukebox can be used for on-line data storage in the occasion required for high data security and long period of the data response, and replace partly the on-line magnetic disk storage device.

The full-text index data corresponding to the database on each optical disk can be stored either on the optical disk of the corresponding database, or in the magnetic disk storage by the database management system (110) to improve the performance of the data search.

An Embodiment for creating a database on an optical disk using the database storage system based on jukebox includes the following steps:

In step 31, a server is connected with a jukebox.

In step 32, the database management system software and the jukebox management software are installed on the server.

In step 33, a drive letter of a virtual jukebox is set up in a configuration file, MYCD=Z:\, wherein MYCD is the drive letter of the virtual jukebox, and Z is the drive letter of the jukebox.

In step 34, a volume label "BD1" is created on an optical disk using the jukebox management software.

In step 35, a database is created on the optical disk in the jukebox; the commands "MYCD:BD1\database1.BAF, MYCD:BD1\database1.BIF", or "Z: BD1\database1.BAF, Z: BD1\database1.BIF" are executed. Wherein the BAF is the main file of the database, which stores the original files and all character information extracted from the original files; the BIF is the reverse file (full-text index data file) for rapid search. Both the BAF and the BIF are stored on the optical disk.

In step 36, data is input into the main file (BAF) of the database and reverse index is performed in the reverse file (BIF) of the database on the optical disk in the jukebox (creating full-text index data).

Another Embodiment for creating a database on an optical disk using the database storage system based on jukebox includes the following steps:

In step 41, a server is connected with a jukebox.

In step 42, the database management system software and the jukebox management software are installed on the server.

In step 43, a drive letter of a virtual jukebox is set up in a configuration file, MYCD=Z:\, wherein MYCD is the drive letter of the virtual jukebox, and Z is the drive letter of the jukebox.

In step 44, a volume label "BD1" is created on an optical disk using the jukebox management software.

In step 45, the main file of a database is created on the optical disk in the jukebox; the commands "MYCD: BD1\database1.BAF", or "Z:\BD1\database1.BAF, " are executed.

In step 46, the reverse file (full-text index data file) of the database is created in the magnetic disk storage; the command "D:\database1.BIF" is executed.

In step 47, data is input into the main file of the database on the optical disk in the jukebox, and reverse index is performed in the reverse file of the database in the magnetic disk storage (creating full-text index data).

One skilled in the art will understand that the embodiments of the present invention as shown in the drawings and described above are exemplary only and not intended to be limiting. It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

INDUSTRIAL APPLICABILITY

According to the database storage system based on jukebox of the present invention, the existing optical disk resource can be fully utilized. Using the jukebox, a large number of optical disks are integrated into the file management of the operation system, a database is created directly on a write-once optical disk or an optical disk of other types and data is input into the database on the optical disk, and the data is managed effectively, as well as the data backup can be performed. Because the data and database on the write-once optical disk cannot be rewritten, are not affected by magnetic impact and have long service life, the system has high security, low power consumption and low carbon emission, the effect of energy-saving and emission reduction is outstanding, therefore a large number of data and databases can be stored in low cost, it is not necessary to purchase a server to backup database. The cost of purchase, capacity expansion, operation and maintenance of the system is low. The data that is stored in the tape library and must be preserved for long-term can be transferred and stored in the jukebox, upgrading for the large scale magnetic tape machine is really realized. The data that is stored in the magnetic disk array and magnetic disk and is used often, but infrequently, can be transferred and stored into the jukebox to actually realize storing data in security, low cost and for long-term, and using data effectively. Therefore, the market prospect is great and the industrial applicability is strong.

What is claimed is:

1. An improved database storage system based on jukebox, comprising:
   a server;
   a jukebox establishing a data connection with the server;
   a magnetic disk storage establishing a data connection with the server;
   a database management system installed in an operation system on the server arranged for completing database management and data management of magnetic disk and optical disk storage devices in response to data requests; and
   a jukebox management system is arranged for completing connection of data structure between the jukebox and the operation system,
   wherein the database management system comprises a field structure generation module, a record index generation module, a storage space allocation module, a storage space status module, a record linkage module, a record split module, a database creation and input on optical disk module, a search-term storage module, and a search-term index generation module,
   the database creation and input on optical disk module creates directly a database file on an optical disk of the jukebox, inputs directly data into a database on the optical disk, by the database management system generates a field structure information and an index information of corresponding records, records a position information and a space information of standard storage units, and forms database properties data of the database on the optical disk;
   the search-term storage module stores a word stock of search terms including semantic information, and the search terms includes at least word, phrase and number;
   the search-term index generation module creates search term index data of the records corresponding to the marked information according to the index information of each record of the database, including frequency of appearance of the search terms and position of the search terms in each record, and writes the index data into the database file or the database management system,
   wherein the database management system further comprises a database structure generation module which forms a definition file of a database structure for a structure information of the database; the database management system creates a database on the magnetic disk having a database structure the same as a database structure on the optical disk in the jukebox based on the definition file of the database structure,
   wherein the database management system further comprises a method for transferring the database created on the magnetic disk onto the optical disk in the jukebox which comprises the steps of:
      (a) obtaining capacity parameters of the optical disk storage media in the jukebox by the database management system through the jukebox management system;
      (b) according to a capacity of the optical disk storage media, complete a splitting of the database on the magnetic disk by the database management system through the record split module, and forming marked information of subdatabases;
      (c) creating the database file on the optical disk in the jukebox by the database management system through the database creation and input on optical disk module;
      (d) writing field structure information of the corresponding records into the database file on each of the optical disks in the jukebox by the database management system through the field structure generation module;
      (e) writing index information of the corresponding records into the database file on each of the optical disks in the jukebox by the database management system through the record index generation module;

(f) writing position information of the standard storage units of the corresponding records into the database file on each of the optical disk in the jukebox by the database management system through the storage space allocation module;

(g) recording space information of the standard storage units by the database management system through the storage space status module;

(h) generating the database properties data in the database on each of the optical disks in the jukebox, and completing the database creation and storage by the database management system through the record linkage module; and (i) generating search term index data corresponding to the database on each of the optical disks by the database management system through the search-term index generation module.

2. The improved database storage system based on jukebox according to claim 1, further comprising a method for directly creating the database on the optical disk in the jukebox, which comprises the steps of:

(a') obtaining capacity parameters of the optical disk storage media in the jukebox by the database management system through the jukebox management system;

(b') creating a database file on the optical disk storage media by the database management system through the database structure generation module;

(c') adding records into the database file on the optical disk storage media by the database management system through the database creation and input on optical disk module, retaining written field structure information of the corresponding records through the field structure generation module, retaining index information of the corresponding records through the record index generation module, retaining position information of the standard storage units of the corresponding records through the storage space allocation module, retaining recorded space information of the standard storage units through the storage space status module, and retaining the database properties data generated through the record linkage module by the database management system;

(d') repeating step (c') and updating the database properties data retained through the record linkage module by the database management system;

(e') when the capacity of the database reaches a capacity value of the storage space of the optical disk, writing the database properties data from step (d') into the database on the optical disk by the database management system, and completing the database creation and the storage of the records on the optical disk;

(f') generating search term index data corresponding to the database on the optical disk by the database management system through the search-term index generation module; and (g') repeating steps (a') to (f') until storing all data of the magnetic disk completely.

3. The improved database storage system based on jukebox according to claim 1, wherein in the step (i), the search term index data corresponding to the database on each of the optical disks is stored on the optical disk storage media corresponding to the database by the database management system.

4. The improved database storage system based on jukebox according to claim 1, wherein in the step (i), the search term index data corresponding to the database on each of the optical disks is stored in the magnetic disk storage by the database management system.

5. The-improved database storage system based on jukebox according to claim 2, wherein in the step (i), the search term index data corresponding to the database on each of the optical disks is stored on the optical disk storage media corresponding to the database by the database management system.

6. The improved database storage system based on jukebox according to claim 2, wherein in the step (i), the search term index data corresponding to the database on each of the optical disks is stored in the magnetic disk storage-by the database management system.

7. The improved database storage system based on jukebox according to claim 1, wherein in the step (f), the search term index data corresponding to the database on each of the optical disks is stored on the optical disk storage media corresponding to the database by the database management system.

8. The improved database storage system based on jukebox according to claim 1, wherein in the step (f), the search term index data corresponding to the database on each of the optical disks is stored in the magnetic disk storage by the database management system.

9. The improved database storage system based on jukebox according to claim 2, wherein in the step (f), the search term index data corresponding to the database on each of the optical disks is stored on the optical disk storage media corresponding to the database by the database management system.

10. The improved database storage system based on jukebox according to claim 2, wherein in the step (f), the search term index data corresponding to the database on each of the optical disks is stored in the magnetic disk storage by the database management system.

* * * * *